United States Patent [19]
Li

[11] Patent Number: 5,852,505
[45] Date of Patent: Dec. 22, 1998

[54] DENSE WAVEGUIDE DIVISION MULTIPLEXERS IMPLEMENTED USING A FIRST STAGE FOURIER FILTER

[75] Inventor: Yuan P. Li, Duluth, Ga.

[73] Assignee: Lucent Technologies Inc., Murray Hill, N.J.

[21] Appl. No.: 759,325

[22] Filed: Dec. 2, 1996

Related U.S. Application Data

[63] Continuation-in-part of Ser. No. 365,618, Dec. 28, 1994, Pat. No. 5,596,661, and a continuation-in-part of Ser. No. 554,332, Nov. 6, 1995, Pat. No. 5,699,176.

[51] Int. Cl.⁶ .................................................. H04B 10/20
[52] U.S. Cl. ......................... 359/118; 359/127; 385/24; 385/27
[58] Field of Search .................................. 359/124, 118, 359/127, 129, 130; 385/24, 16, 14, 37, 27, 46

[56] References Cited

U.S. PATENT DOCUMENTS

| | | | |
|---|---|---|---|
| 5,136,671 | 8/1992 | Dragone | 385/46 |
| 5,412,744 | 5/1995 | Dragone | 385/24 |
| 5,414,548 | 5/1995 | Tachikawa et al. | 359/130 |
| 5,596,661 | 1/1997 | Henry et al. | 385/24 |
| 5,680,490 | 10/1997 | Cohen et al. | 385/24 |
| 5,719,976 | 2/1998 | Henry et al. | 385/50 |

*Primary Examiner*—Rafael Bacares

[57] ABSTRACT

A comb splitting system demultiplexes and/or multiplexes a plurality of optical signal channels at various wavelengths. The comb splitting system has at least two interconnected successive stages of wavelength division multiplexers (WDMs). The first stage comprises a Fourier filter that communicates bands of channels to respective WDMs of the second stage via suitable optical paths. Each of the bands has a plurality of the individual channels that are separated by at least one other of the channels. Each second stage WDM, which is allocated to a particular band, is interconnected to respective optical paths for carrying one or more individual channels. Furthermore, in accordance with a significant feature of the present invention, the passband width and periodicity (i.e., free spectral range) associated with the first stage Fourier filter are smaller than the passband width and periodicity associated with the second stage WDMs. Consequently, the second stage WDMs can be less expensive and physically smaller than the first stage WDM. Moreover, later stages can tolerate larger fabrication errors, do not require birefringence compensation, and can tolerate full environmental temperature variations without feedback control in the central office. In accordance with another feature of the present invention, a double filtering scheme can be utilized to reduce crosstalk between channels.

19 Claims, 8 Drawing Sheets

FIG. 3A

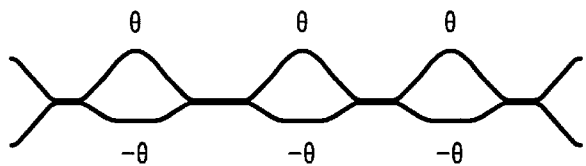

$\theta+\theta+\theta = 3\theta \qquad -\theta-\theta-\theta = -3\theta$ $\left.\begin{array}{l}\theta+\theta-\theta\\\theta-\theta+\theta\\-\theta+\theta+\theta\end{array}\right\} = \theta \qquad \left.\begin{array}{l}-\theta-\theta+\theta\\-\theta+\theta-\theta\\\theta-\theta-\theta\end{array}\right\} = -\theta$

FIG. 3B

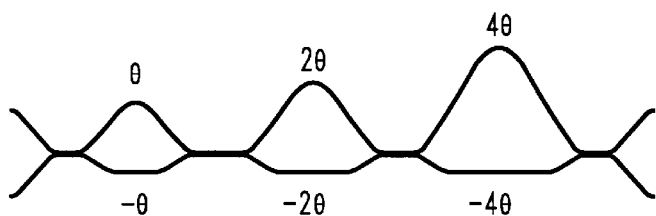

$\theta+2\theta+4\theta = 7\theta \qquad -\theta-2\theta-4\theta = -7\theta$ $-\theta+2\theta+4\theta = 5\theta \qquad \theta-2\theta-4\theta = -5\theta$ $\theta-2\theta+4\theta = 3\theta \qquad -\theta+2\theta-4\theta = -3\theta$ $-\theta-2\theta+4\theta = \theta \qquad \theta+2\theta-4\theta = -\theta$

FIG. 3C

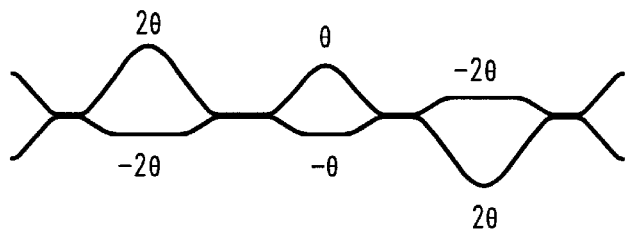

$2\theta+\theta+2\theta = 5\theta \qquad -2\theta-\theta-2\theta = -5\theta$ $2\theta-\theta+2\theta = 3\theta \qquad -2\theta+\theta-2\theta = -3\theta$ $\left.\begin{array}{l}-2\theta+\theta+2\theta\\2\theta+\theta-2\theta\end{array}\right\} = \theta \qquad \left.\begin{array}{l}-2\theta-\theta+2\theta\\2\theta-\theta-2\theta\end{array}\right\} = -\theta$ $\lambda(\mu m)$

DENSE WAVEGUIDE DIVISION MULTIPLEXERS IMPLEMENTED USING A FIRST STAGE FOURIER FILTER

This application is a continuation-in-part of application Ser. No. 08/365,618, entitled "Monolithic Optical Waveguide Filters Based On Fourier Expansion," filed Dec. 28, 1994, now U.S. Pat. No. 5,596,661 and application Ser. No. 08/554,332, entitled "Comb Splitting System And Method For A Multichannel Optical Fiber Communication Network," filed Nov. 6, 1995.

FIELD OF THE INVENTION

The present invention generally relates to optical fiber communication networks, and more particularly, to a dense waveguide division multiplexer for use in a fiber communication network and that is implemented using a comb splitting scheme with a Fourier Filter in the first stage and Mach-Zehnder filters or Fourier filters in the subsequent stages.

BACKGROUND OF THE INVENTION

Recent research and development has focused on implementing optical communication networks to communicate information from central offices to individual living units (e.g., a subscriber's home) and from the individual living units to the central offices. Several network approaches have been proposed, including for example, fiber-to-the-home (FTTH) and fiber-to-the-curb (FFTC) architectures. A key for any such fiber communication network is the ability to multiplex and demultiplex optical signals. The preferred optical device for performing such functions is a waveguide division multiplexer (WDM).

A WDM is usually a passive optical network (PON) or device with multiple optical paths, each of which exhibits a particular passband. The passband permits passage of one or more particular wavelengths along the respective optical path, to the substantial exclusion of others. Thus, the WDM can be used to divide wavelengths (or channels) from a multichannel optical signal or to combine various wavelengths (or channels) on respective optical paths into one multichannel optical signal on one optical path. An example of a WDM is described in U.S. Pat. No. 5,136,671 to Dragone.

There are essentially three classes of WDMs: coarse, intermediate, and dense. Coarse WDMs are configured for dividing and combining two wavelengths (or channels) that are space relatively far apart, e.g., a 1310/1550 nanometers (nm) WDM used to separate wavelength bands (with 100 nm bandwidth) centered around 1310 nm and 1550 nm. Intermediate WDMs are configured for dividing and combining two to three wavelengths (or channels) that are spaced closer than those of the course WDMs, e.g., a 1540/1560 nm WDM used to put two channels approximately 20 nm apart in the 1550 nm wavelength band. Lastly, and subject of the present invention, dense WDMs (also referred to as DWDMs) are configured for dividing and combining four or more wavelengths (or channels) that are very closely spaced, e.g., a 1×32 DWDM where the spacing between wavelengths can be as small as approximately 0.8 nm. A DWDM can be used to pack 32 wavelengths in a single fiber in a bandwidth range within the capacity of erbium doped fiber amplifiers (EDFAs).

Because of the close spacing between the channels in a DWDM, it is desirable to design a DWDM having flat passbands in order to increase the error tolerance, as is appreciated by those of ordinary skill in the art. This is primarily because the center wavelength of a passband shifts with temperature, usually on the order of about 0.011 nm/° C. Further, the cascading of DWDMs in an add-drop network causes the passbands to become more narrow at each DWDM down the chain. Therefore, the flatter the passband, the greater the shift tolerance of the channel.

Further, it is desirable to design a DWDM with low loss because, inter alia, a DWDM having low loss leaves more room for other components in a network. For example, if large fiber loss is allowed, then the distance the fiber reaches (i.e., the span) can be longer. As another example, if the power of the transmitting lasers is allowed to be reduced as a result of the reduced DWDM loss, then inexpensive lasers can be used. These are important and practical issues in fiber-to-the-home (FTTH) and fiber-to-the-curb (FTTC) networks. Furthermore, the loss for all the output ports of a DWDM should be substantially uniform, or otherwise, the other components in the network must be designed to tolerate large loss changes or power equalization must be employed.

Yet even further, it is desirable to design a DWDM that is spacially efficient, that is, a DWDM that is as small as possible. This is because DWDMs are typically fabricated on a chip with a relatively expensive process, and therefore, the more DWDMs or other components that can fit on a chip, the more cost efficient the fabrication process.

In an effort to provide a DWDM with flat passbands, it has been disclosed in U.S. Pat. No. 5,412,744 to Dragone that connecting a Y-branch coupler to two adjacent input waveguides of a waveguide grating router DWDM, the passband is widened and flattened. However, there are certain excess insertion losses associated with DWDMs that are implemented with waveguide grating routers (WGR), such as the Dragone router DWDM disclosed in U.S. Pat. No. 5,412,744. For instance, slab-grating interference (sometimes referred to as discontinuity) introduces approximately 2 decibels (dB) of loss in each of the channels. Another excess loss that is occurring in the signals of the channels at the edges of the DWDM is referred to as roll-off. Roll-off can be responsible for up to an extra 2 dB loss in the edge channels with respect to the center channels. This is particularly undesirable because the power levels in the edge channels may fall below the sensitivity of the far-end receiver. Lastly, if the DWDM includes a Y-branch coupler in order to widen and flatten the passband, the Y-branch coupler introduces another 2 dB loss in the DWDM.

It is further noted that DWDMs implemented with waveguide grating routers, such as the one disclosed in U.S. Pat. No. 5,412,744, are accurate in shape. This results in an efficient usage of space on a chip, essentially limiting the number of DWDMs that can be fabricated on a chip to typically around three, or fewer.

Hence, a heretofore unaddressed need exists in the industry for a DWDM that has flat passbands, no excess loss, and that provides uniform power at all output ports.

SUMMARY OF THE INVENTION

Briefly stated, the present invention provides for a dense waveguide division multiplexer (DWDM) implemented using a Fourier filter at the input of a series of cascaded monolithic optical waveguides filters that are configured in a comb splitting scheme. This Fourier DWDM can be utilized in a demultiplexing mode to demultiplex an optical signal having a plurality of multiplexed channels at various wavelengths into a plurality of individual channels and/or in a multiplexing mode to multiplex a plurality of channels at different wavelengths into a single optical signal. A particular application of the Fourier DWDM of the present invention is as a passive DWDM in a fiber-to-the-home (FTTH) network where device's excess insertion loss is critical.

Structurally, the Fourier DWDM is configured as a comb splitting system with at least two interconnected successive stages of monolithic optical waveguide filters. Though the system is described in a preferred embodiment relative to four stages, it should be understood that fewer, or more, than four stages may be implemented, with two stages being the minimum. In accordance with a significant feature of the present invention, the first stage comprises a Fourier filter. Since the passband of the first stage of a comb splitting system is the narrowest, the flat passband of the first stage Fourier filter defines the response of the Fourier DWDM. The first stage Fourier filter includes a chain of three or more optical couplers of different effective lengths linked by differential delays as determined by coefficients of a Fourier series. The first stage Fourier filter communicates bands of channels to respective monolithic optical waveguides filters, such as Mach-Zehnder filters or Fourier filters, comprising the second stage of the DWDM via suitable optical paths, for example, an optical fiber, waveguide, or other optical signal carrier that carries a multichannel optical signal having a plurality of individual channels at various wavelengths. Each of the bands has a plurality of individual channels that are separated by at least one other of the channels, that is, there is no more than every other channel in a single band.

Each second stage filter is allocated a particular band of channels which the respective filters further divide into individual bands of fewer channels, each channel being separated by at least two other of the channels, that is, there is no more than every third channel in an output band. In essence, each filter of the Fourier DWDM sends alternate channels to each of the two output optical paths (or ports), and thus, comb-splits the channels of the input band. For example, in the first stage, channels 1,3,5, . . . are directed to output port 1, and channels 2,4,6, . . . are directed to output port 2. In the first Fourier filter of the second stage, channels 1,5,9, . . . are directed to output port 1, and channels 3,7,11, . . . are directed to output port 2. In the second Fourier filter of the second stage, channels 2,6,10, . . . are directed to output port 1, and channels 4,8,12, . . . are directed to output port 2. The output optical paths of the second stage filters are interconnected to respective inputs of the filters comprising the third stage.

In a substantially similar manner, the third and fourth stages further divide their respective bands down to the output optical paths at the output of the fourth stage. Each output optical path receives one or more individual channels.

Because of the type of filters used to implement the Fourier DWDM are limited to a 1×2 split ratio, the split ratio of the Fourier DWDM is defined by $1 \times 2^N$, where N is the number of stages. Thus, the denseness of the Fourier DWDM can be precisely engineered.

An alternative embodiment of the present invention comprises a double filtering scheme of the Fourier DWDM. In this configuration, two similar filters are connected in series to form a single stage in order to enhance the wavelength isolation performed in the demultiplex mode of operation. In essentially all other respects, the double filtering Fourier DWDM is the same as the preferred embodiment described above.

The operation of a Fourier DWDM in accordance with the present invention is as follows. Because the operation of the Fourier DWDM in the multiplexing mode is generally analogous to the demultiplexing mode, but in reverse order, only the operation in the demultiplexing mode is set forth hereafter for simplicity. Initially, the first stage Fourier filter receives the multichannel optical signal having the plurality of individual channels at various wavelengths. The Fourier filter demultiplexes the optical signal into a plurality of bands forming a wavelength comb. Each of the bands in the comb includes a plurality of individual channels that are separated by at least one other of the channels, with a spacing defined by the free spectral range. Furthermore, the second stage has an monolithic optical waveguide filter, such as a Mach-Zehnder filter or a Fourier filter, allocated to each of the bands for demultiplexing the channels from each of the bands with bandpass filters that have a wider bandpass than the bandpasses associated with the first stage Fourier filters. In a successive fashion, each subsequent stage of monolithic optical waveguide filters further demultiplexes the bands so that each output optical path at the output of stage four receives one or more individual channels.

A novel method provided by the present invention can be broadly summarized as follows. In the demultiplexing mode, an optical signal having a plurality of individual channels at various wavelengths is received by a first stage Fourier filter, and the individual channels are demultiplexed from the plurality into bands on corresponding optical paths. The channels in each of the bands is separated by at least one other channel. Next, the bands are communicated to respective second stage monolithic optical waveguide filters and individual channels of a band are further demultiplexed from each other by the second stage monolithic optical waveguide filters with bandpasses that are wider than the bandpasses of the first stage Fourier filters. The same step performed at the second stage is repeated for each subsequent stage until the output optical paths are carrying individual (or multiple) channels.

Similarly, but in reverse order, the novel method as applied to the multiplexing mode is as follows. First, a plurality of individual channels are multiplexed into bands via bandpasses associated with fourth stage monolithic optical waveguide filters. The channels in each of the bands are separated by at least one other channel. Second, the bands are further multiplexed into larger bands having more channels by the third stage monolithic optical waveguide filters. In the same manner, the second stage performs yet further multiplexing. The bands are finally multiplexed from the bands of the second stage to form a single multichannel signal by utilizing a first stage Fourier filter and its associated bandpasses that are narrower than the bandpasses of the second stage monolithic optical waveguide filters.

The present invention has numerous advantages, a few of which are delineated hereafter, as examples.

An advantage of the Fourier DWDM of the present invention is it does not have the excess insertion loss associated with waveguide grating routers. Specifically, the Fourier DWDM does not have loss due to the slab-grating interfaces, roll-off, or Y-branch couplers at the inputs.

Another advantage of the Fourier DWDM of the present invention is that the output optical signals have uniform power.

Another advantage of the Fourier DWDM of the present inventions that it is relatively small in size. This is important because it allows for more efficient production and more convenient packaging.

Another advantage of the Fourier DWDM of the present inventions that it simplifies the alignment of the WDM passbands with the wavelengths of the transmitters/receivers in a central office.

Another advantage of the Fourier DWDM of the present invention is that it has substantially flat and wide passbands that are substantially insensitive to wavelength shifts, such as those caused by temperature fluctuations.

Another advantage of the Fourier DWDM of the present invention is that it is simple in structure, easy to implement and fabricate on a mass scale, and reliable in operation.

Another advantage of the Fourier DWDM of the present invention is that it can be implemented on a single integrated circuit (IC).

Another advantage of the Fourier DWDM of the present invention, particularly with regard to the alternative embodiment, is that it effectively reduces accumulated crosstalk between channels.

Other features and advantages of the present invention will become apparent to one with skill in the art upon examination of the following drawings and detailed description. It is intended that all such additional features and advantages be included herein within the scope of the present invention, as is defined in the appended claims.

BRIEF DESCRIPTION OF THE DRAWINGS

The present invention can be better understood with reference to the following drawings. The drawings are not necessarily to scale, emphasis instead being placed upon clearly illustrating principles of the present invention. Moreover, like reference numerals designate corresponding parts throughout the several views.

FIGS. 3(a), 3(b) and 3(c) are schematic examples of four-coupler chain filters of consecutive odd Fourier harmonics;

DETAILED DESCRIPTION OF THE PREFERRED EMBODIMENT

I. Introduction

A dense waveguide division multiplexer (DWDM) in accordance with the present invention utilizes a Fourier filter in a first stage of a comb splitting system and monolithic waveguide filters, such as Mach-Zehnder filters, in subsequent stages of the comb splitting system. The Fourier filter in the first stage of the DWDM provides a flat and substantially wide passband. The DWDM of the present invention does not have the excess insertion losses associated with a DWDM implemented with a waveguide grating router (WGR), such as a Dragone router, because of the Fourier filter design. The following discussion initially describes the principles of Fourier filters and comb splitting. Thereafter, a preferred embodiment of the present invention is described wherein a 1×16 DWDM is implemented utilizing a four stage comb splitting scheme. Lastly, an alternative embodiment of the present invention is described wherein a 1×8 DWDM is implemented utilizing a double filtering scheme in a three stage comb splitting system.

II. Fourier Filters

Figure 1:
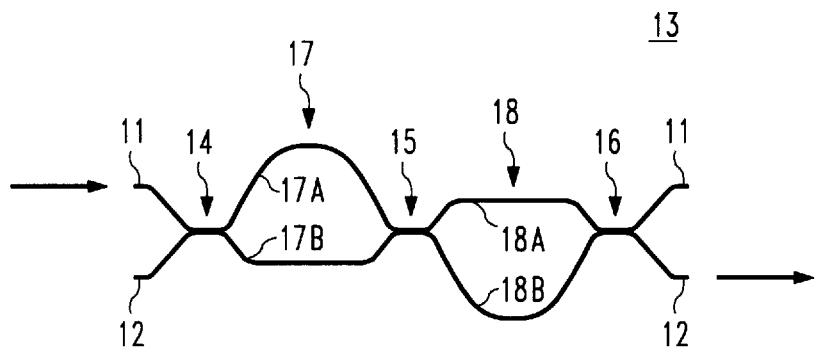
FIG. 1 is a schematic top plan view of an illustrative Fourier filter in accordance with the present invention.

A generalized discussion of a monolithic filter based on Fourier expansion is provided herein. Referring to the drawings, FIG. 1 is a schematic top view of a simple form of a monolithic optical waveguide filter 10 comprising a pair of optical waveguides 11 and 12 on a substrate 13 configured to form a plurality N of at least three optical couplers 14, 15, and 16, alternately connected by a plurality of N-1 delay paths 17 and 18. Each coupler is comprised of a region of close adjacency of the two waveguides where the exponential tail of light transmitted on each of waveguides 11 and 12 interacts with the other, coupling light from one waveguide to the other. The amount of power coupled from one waveguide to the other is characterized by the effective length of the coupler. The effective lengths of the couplers preferably differ from each by more than 5%. Further, the effective length of any coupler is within 5% of at most one other coupler.

Each delay path 17, 18 comprises a pair of waveguide segments between two couplers, for example segments 17A and 17B between couplers 14 and 15. The segments are configured to provide unequal optical path lengths between the two couplers, thereby providing a differential delay. For example, in FIG. 1, upper segment 17A is longer than lower segment 17B, providing a differential delay which can be denoted positive. Delay path 18 provides a negative delay because lower segment 18B is longer than upper segment 18A. It is preferred that at least one differential delay differs from at least one other by 10% or more and at least one differential delay is opposite in sign from at least one other.

In operation, an optical input signal is presented at an input coupler, e.g., along waveguide 11 to coupler 14, and a filtered output is presented at an output coupler, e.g., along waveguide 12 at coupler 16. The sequence of couplers and delays provide light at the input with a plurality of paths to the output. In general there will be $2^{N-1}$ paths where N is the number of couplers. For example, the FIG. 1 device presents the following four paths:

1) segment 17A–segment 18A
2) segment 17A–segment 18B
3) segment 17B–segment 18A
4) segment 17B–segment 18B In accordance with an important aspect of Fourier filters, each of the optical paths of the filter provide light corresponding to a harmonic component in a Fourier series whose summation constitutes the transmission function of the filter. By proper choice of parameters, one can closely approximate a desired transmission function. By choice of N and the set of differential delays, one can design a filter presenting a summation of both even and odd Fourier components. A preferred odd harmonic filter can be made by providing differential delays with a normalized ratio of $\pm 1/\pm 2/\pm 2/ \ldots /\pm 2$ in any order, and a preferred all harmonic filter can be made by providing differential delays with a normalized ratio of $\pm 1/\pm 1/\pm 2/\pm 2/ \ldots /\pm 2$ in any order. Moreover, in the above ratios, any but not all of the differential delays of $\pm 2$ can be replaced by $\pm 4$, and any but not all of the differential delays of $\pm 4$ can in turn be replaced by 18, so forth and so on. In addition, for broadband filters, the wavelength dependence of practical waveguide properties is advantageously taken into account, which can alter the above proportional differential delays by up to $\pm 25\%$. Thus, in one preferred embodiment of a Fourier filter, the delay paths provide, in any order, within $\pm 25\%$, one differential delay of proportion $\pm 1$ and one or more differential delays of proportion $\pm 2$ or $\pm 4$ or $\pm 8$. In another preferred embodiment of a Fourier filter, the delay paths provide, in any order, within $\pm 25\%$, one differential delay of proportion $\pm 1$, and one or more differential delays of proportion $\pm 2$ or $\pm 4$ or $\pm 8$. Advantageously, the filter can be combined with other filters, as by connecting the other filters to the waveguide outputs, thereby producing filter networks as is done by the present invention via a comb splitting scheme.

The basic structure of a Fourier filters consists of a chain of N arbitrary couplers and N–1 differential delays, where N>2. The transmission spectrum of such a chain (referred to as an N-coupler chain) is the sum of contributions from $2^{N-1}$ optical paths, each of which forms a term in a Fourier series. The length of the couplers and delay paths can be optimized so that this Fourier series best approximates a desired frequency response.

The principle of the sum of contributions from all possible paths is as follows. The electric fields at the two output ports of an ideal coupler of two identical waveguides are related to those at the input ports by a transfer matrix:

$$T_\phi = \begin{bmatrix} \cos\phi & i\sin\phi \\ i\sin\phi & \cos\phi \end{bmatrix} \quad (1)$$

where $i=(-1)^{1/2}$, and $\phi=\pi l'/2L$, where $l'$ is the geometric length of the coupler and L is the coupling length which is a measure of the strength of coupling between the two waveguides (not to be confused with the geometric length of the coupler). Herein, $l'/L$ is referred to as the effective length of the coupler.

Similarly, the transfer matrix characterizing the differential delay between two identical waveguides is:

$$T_\theta = \begin{bmatrix} e^{i\theta} & 0 \\ 0 & e^{-i\theta} \end{bmatrix} \quad (2)$$

where $\theta=\pi s\tilde{n}/\lambda=\pi s\tilde{n}v/c$, s is the difference in the lengths of the two waveguides, $\tilde{n}$ is the effective refractive index of the waveguides, and $\lambda$, $v$, and c are the optical wavelength, frequency, and velocity in free space, respectively. Note that a common phase factor has been ignored in Eq. (2) because it is non-essential to the filter response.

The transfer matrix of our waveguide filter, consisting of a chain of N couplers and N–1 differential delays characterized by $\phi$, $\phi_1$, $\phi_2$ and $\theta_1, \theta_2, \ldots, \theta^{N-1}$, respectively, is given by:

$$T_{\phi\theta}=T\phi_N T\theta_{N-1}\ldots T_{\theta2}T\phi_2 T_{\theta1}T\phi_1 \quad (3)$$

From the above matrix product we see that the transfer function from any input port to any output port consists of a sum of the form:

$$t_{\phi\theta}=\Sigma f(\phi_1, \phi_2, \ldots, \phi_N)e^{i(\pm\theta_1 \pm\theta_2 \cdots \pm\theta_{N-1})} \quad (4)$$

Note that $\theta$ is proportional to $v$ which is proportional to $1/\lambda$ if we ignore the wavelength dependence of $\tilde{n}$.

Physically, Eq. (4) can be interpreted as the principle that the response is the sum over all possible optical paths. The transfer function from any input port to any output port of a chain of N couplers and N–1 differential delays consists of the unweighted sum of contributions of $2^{N-1}$ distinct optical paths. Each of such contributions is a product of 2N–1 factors: traversing a coupler gives $\cos\phi$ without crossing and $i\sin\phi$ with crossing; traversing the longer arm of a differential delay gives $e^{i\theta}$ and the shorter arm gives $e^{-i\theta}$.

Figure 2A:
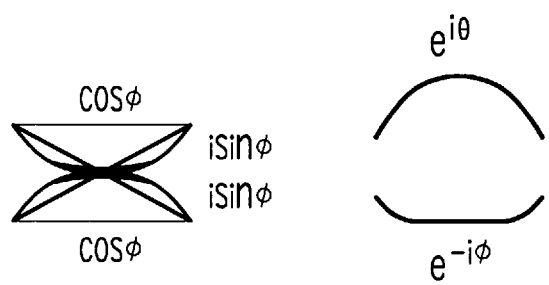
FIGS. 2(a) and 2(b) are diagrams illustrating the design principle that the Fourier filter output is the sum of all optical paths.
Figure 2B:
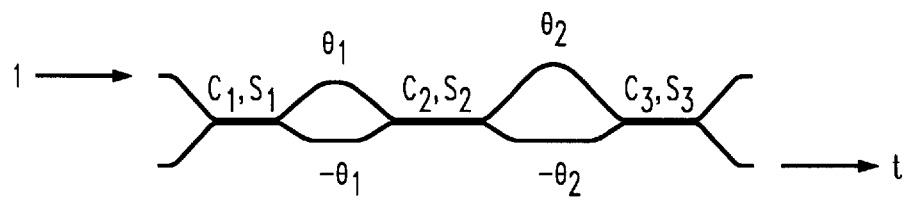

This principle is illustrated in FIGS. 2(a) and 2(b). FIG. 2(a) diagrams the contributions from the paths in a coupler and a differential delay. FIG. 2(b) shows the cross state of a three coupler chain where $c\equiv\cos\phi$ and $s\equiv\sin\phi$ and the letter t designates the transfer function. For N=3, there are four distinct optical paths from any input port to any output port, and the transfer function shown in FIG. 2(b) is a sum of four terms. For non-ideal couplers, $\cos\phi$ and $i\sin\phi$ should be corrected accordingly, but the above principle is still valid.

The construction of a Fourier series is as follows. With arbitrary choices of the $\theta$'s, the sum in Eq. (4) above is normally not a Fourier series because the terms in the sum do not normally represent harmonics. However, Eq. (4) becomes a truncated Fourier series if the ratio among the lengths of the differential delays satisfies certain conditions. In the following, Eq. (5) defines $\theta_j(v)$ as:

$$\theta_j(v)=\gamma_j\theta_0(v), \text{ and } j=1,2,\ldots, N-1 \quad (5)$$

where $\theta_0$ contains the common wavelength-dependent part of $\theta_1, \theta_2, \ldots, \theta_{N-1}$ and has the same period as the fundamental harmonic in the Fourier series. The unnormalized ratio $\gamma_1/\gamma_2/\ldots/\gamma_{N-1}$ will be referred to as the $\theta$-ratio.

For WDMs with a rectangular response, because of the odd symmetry of the required transfer function, a Fourier series with only odd harmonics is needed. Consider the following two extreme conditions which give consecutive odd harmonics:

Condition A: If N is even and the $\theta$-ratio is $\pm 1/\pm 1\ldots/\pm 1$ with any sign combinations, $t_{\phi\theta}$ is a Fourier series with harmonics $\pm\theta_0, \pm 3\theta_0, \ldots, \pm(N-1)\theta_0$.

Condition B: If the $\theta$-ratio is $\pm 1/\pm 2/\pm 4/\ldots/\pm 2^{N-2}$, in any order and with any sign combinations, $t_{\phi\theta}$ is a Fourier series with harmonics $\pm\theta_0, \pm 3\theta_0, \ldots, \pm(2^{N-1})\theta_0$.

For a given even N, condition B gives the maximum number of consecutive odd harmonics while condition A gives the minimum. There are many other conditions in between, such as:

Condition C: If the $\theta$-ratio is $\pm 1/\pm 2/\pm 2/\ldots/\pm 2$, in any order and with any sign combinations, $t_{100\theta}$ is a Fourier series with harmonics $\pm\theta_0, \pm 3\theta_0, \ldots, \pm(2N-3)\theta_0$.

Referring to FIGS. 3(a), 3(b) and 3(c), illustrated is the construction of the Fourier harmonics using N–4 with examples of $\theta$-ratios of 1/1/1, 1/2/4, and 2/1/–2, each corresponding to a special case of conditions A, B, and C, respectively. Note that a negative sign in the $\theta$-ratio corresponds to an interchange of the longer and shorter delay arm. For clarity, is used in the drawing for $\theta_0$. A negative $\phi$ cannot be physically realized. However, $\pi-\phi$ is equivalent to $-\phi$ in that the transfer functions of the two cases differ only by a constant phase.

While consecutive odd harmonics are needed for WDMs, other filter functions may need even harmonics as well. A Fourier series with consecutive even harmonics is constructed when one of the sections corresponding to the $\pm 1$'s in conditions A, B, and C is taken out of the N-coupler chain, resulting in an (N−1) coupler chain. A Fourier series with all consecutive harmonics can also be constructed by halving all the delays in conditions A, B, and C and adding another section with the minimum unit delay. The θ-ratios for conditions A, B, and C become ±½/ ±½/ . . . / ±½ (and N is odd), ±½/ ±½/ ±1/ ±2/ . . . / ±$2^{N-4}$, and ±½/ ±½/ ±1/ . . . / ±1, respectively. The corresponding normalized ratios of the differential delays are ±1/ ±1/ . . . / ±1, ±1/ ±1/±2/ ±4/ . . . / ±$2^{N-3}$, and ±1/ ±1 /±2/ . . . / ±2, respectively.

Figure 4A:
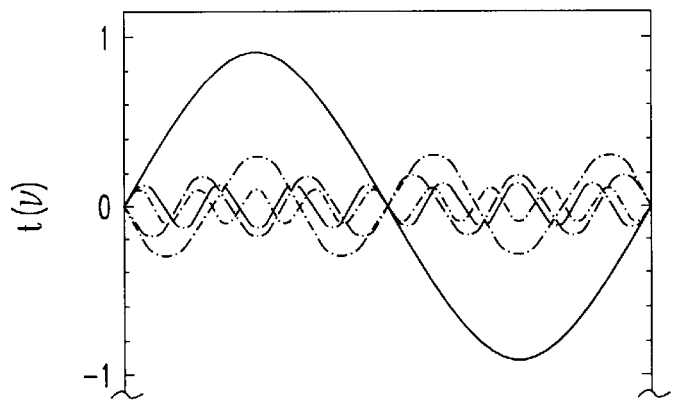
FIGS. 4(a), 4(b) and 4(c) illustrate the approximation of a rectangular filter response by a Fourier series.
Figure 4B:
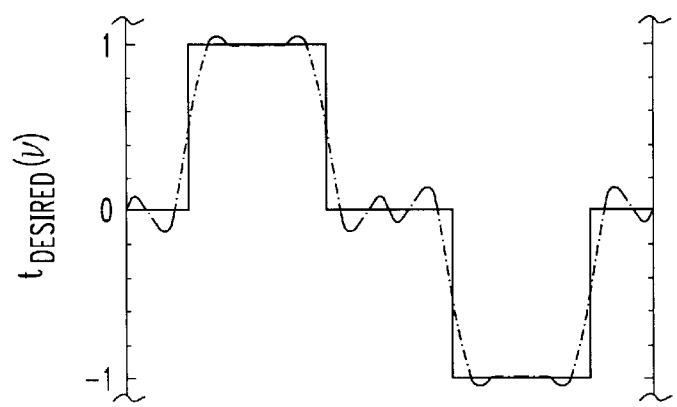
Figure 4C:
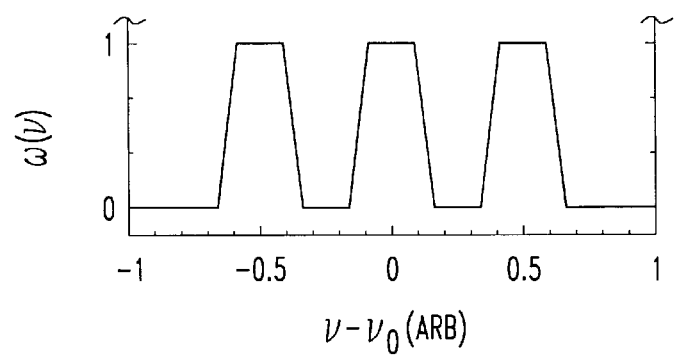

The optimization of a Fourier filter response is as follows. Up to this point, it has been shown that the transfer function of chain couplers and delays can form a truncated Fourier series. FIG. 4 further demonstrates the basis of approximating the frequency response of a desired filter by such a truncated Fourier series (for the purpose of illustration, the phase is ignored). The Mach-Zehnder interferometer (N=2) only has the fundamental harmonic and its frequency response sinusoidal as shown by the solid curve in FIG. 4(a). In contrast, the desired rectangular response of a filter is shown by the solid curve in FIG. 4(b). For N>2 under conditions A, B, or C, the transfer function also contains higher order harmonics, shown by the broken curves in FIG. 4(a). The sum of the fundamental and higher order harmonics, as shown by the broken curve in FIG. 4(b), can approximate the rectangular response if their amplitudes and phases are chosen correctly. In the following, in order to give a clear physical picture, the wavelength dependence of L (and hence the φ's are constants) and ñ are ignored and the more general case is discussed later.

First, the common factor $θ_0$ of the differential delays can be determined solely by the positions of the passband and the stopband, similar to the case of a simple MZ. It is desirable to have the fundamental harmonic to have a phase of θ or π at the center of the stopband and π/2 at the center of the passband. Therefore, θ can be written as:

$$θ_{os}/π = sñ/λ_s = m \text{ and } θ_{op}/π = sñ/λ_p = m + ½ \quad (6)$$

where m is an integer, which is referred to herein as the order of the filter, and the subscripts p and s refer to the center of passband and stopband. Since the output ports can be interchanged, there is another configuration corresponding to the interchange of s and p in Eq. (6). For the 1.3/1.55 μm WDM filter, the best solutions are (m=3, $λ_p$=1.322 μm, $λ_s$=1.542 μm) and (m=3, $λ_p$=1.566 μm, $λ_s$=1.305 μm). Thus, explicitly use is made of the fact that the transfer function expressed by the Fourier series is periodic in frequency.

Now the values of the φ's are found under a given condition that renders the Fourier series with consecutive odd harmonics. Note that, except under condition A, the number of harmonics exceeds the number of couplers N. Therefore, the number of Fourier coefficients to be determined is generally larger than the number of free variables available. Moreover, for broadband filters, the phase response is not important, and we only require $|t_{φθ}|^2$ to have the desired response which is rectangular in the present 1.3/155 μm WDM. Therefore, an error function can be minimized to solve for the φ's under a given θ-ratio as in the following:

$$E_{φθ} = ∫ dvw(v)(|t_{φθ}| - t_{desired}(v)|)^2 = \min \quad (7)$$

where w(v) is a positive weighting function, and the integration is done in the passband and stopband of interest. Since for the 1.3/1.55 μm WDM, it is not desirable to constrain the transition between the passband and stopband, then set w(v)=0 in those regions (as in FIG. 4(c)). Equation (7) represents a nonlinear minimization problem which can be solved numerically by iterative methods such as the simplex or conjugate gradient methods. Although in the present design of the 1.3/1.55 μm WDM, where the phase response is ignored, if a particular phase response is desired, it can also be put into the above equation and optimized together with the amplitude.

Note that $E_{φθ}$ has many local and equivalent minima which correspond to different configurations having similar or the same amplitude response. For example, if one of the couplers in the middle of an N-coupler chain is a full coupler (φ=(n+½)π where n is an integer) or a null coupler (φ=nπ), this coupler and the two differential delays around it degenerate into the equivalence of a single differential delay, and an (N−1) coupler chain results. Thus a minimum in $E_{φθ}$ of an (N−1)-coupler chain can be reproduced with an N-coupler chain which is a local minimum. Moreover, if the length of a coupler is changed in such a way that φ is replaced by φ+2nπ or (2n−1) π−φ, then $|t_{φθ}|$ is unchanged, and an equivalent minimum is produced. Furthermore, a different sequence of θ's or a different set of ± signs in front of the θ's gives different equivalent and local minima. The different combinations of these variations give rise to large number of configurations. Interchanging the two output ports brings in another set of distinct configurations (which correspond to $φ_1$=π/4 and $φ_2$=(3/4) π for the conventional MZ). Therefore, physical insight is often needed to get good starting parameters for the iterations to arrive to the best solution. For example, start with the original MZ (N=2) and successively increase N, taking the results of N−1 as the starting parameter of N.

The best choice of the θ-ratio that gives the closest approximation of the required filter response for a given N must still be found. In the extreme of condition A, all the Fourier coefficients can be satisfied independently, but the number of harmonics in the series is small. In the other extreme, under condition B, although the number of harmonics is large, they are greatly constrained by the number of free variables. Therefore, there is an optimum condition in between A and B. Our numerical calculations show that condition C is in fact the optimum for filters with a rectangular response.

Figure 5A:
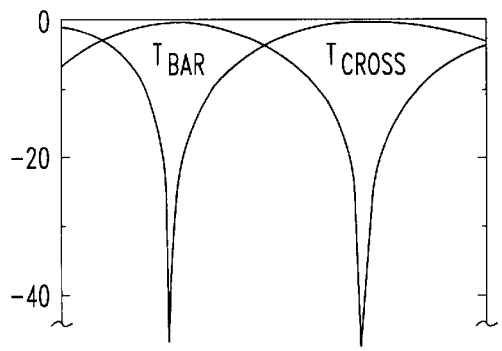
FIG. 5(a)–5(f) show the effect of various steps to optimize a five coupler chain filter.

FIGS. 5(a) through 5(f) illustrate the effect of various steps to optimize the configuration design. FIG. 5(a) shows the bar and cross state power transmission of a conventional Mach-Zehnder interferometer in a semi-log plot.

Figure 5B:
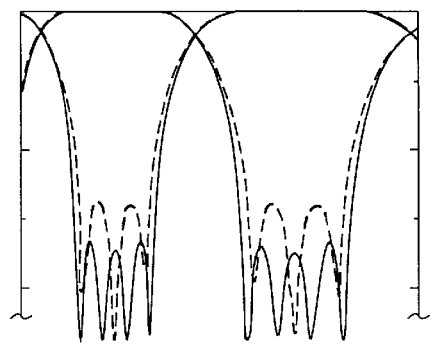

The solid curves in FIG. 5(b) are the bar- and cross-state transmission spectrum of a five-coupler chain satisfying condition C with a θ-ratio of 1/2/−2/−2, optimized when assuming L and ñ are independent of λ. Compared to the spectrum of the corresponding MZ shown in FIG. 5(a), the width and flatness of the passband, as well as the width and rejection of the stopband, are greatly improved. The dashed curves in FIG. 5(b) show the corresponding transmission of a six-coupler chain with a θ-ratio of 1/1/1/1/1 (i.e., condition A). Compared to the solid curves of the five-coupler 1/2/−2/−2 chain, the passband becomes narrower and the rejection lower. In fact, the response of this six-coupler chain is the same as a four-coupler chain with a θ-ratio of 1/2/2. Similarly, when one or more of the 2's are replaced in the 1/2/−2/−2 chain by 4 or 8, the filter response becomes worse as well as the device length becomes longer. It is therefore concluded that condition C gives the most efficient WDM configuration.

Figure 5C:
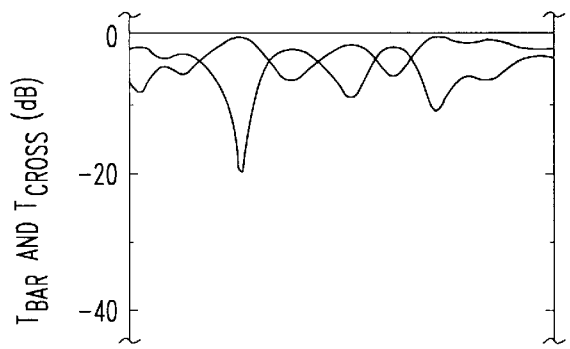

So far, it has been assumed that the coupling length L and the effective refractive index ñ do not depend on wavelength, which is only valid for narrow-band WDMs. In reality, L inevitably decreases as the wavelength is increased, because the optical field is more confined at shorter wavelength. With the present planar waveguide fabrication processes, L increases by about a factor of two as λ changes from 1.55 μm to 1.3 μm, implying that a 3 dB coupler at 1.3 μm becomes a full coupler at about 1.55 μm. Moreover. $\tilde{n}$ also changes with λ because of the change in confinement and the dispersion of the waveguide material, but the relative change is much smaller (about 0.5% for our waveguide) than L. FIG. 5(c) shows the response of the same five-coupler chain as in FIG. 5(b) (which was designed for L=L $|_{\lambda=1.42 \mu m}$=constant and $\tilde{n}=\tilde{n}$ $|_{\lambda=1.42 \mu m}$=constant), except now the wavelength dependent L, and $\tilde{n}$ is advantageously considered in the design.

Figure 5D:
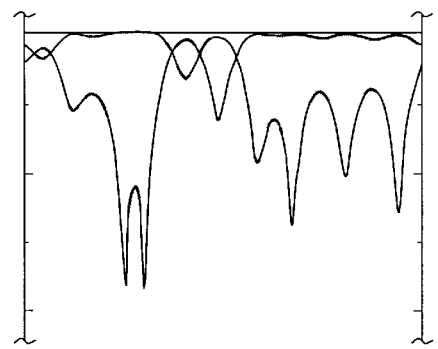
Figure 5E:
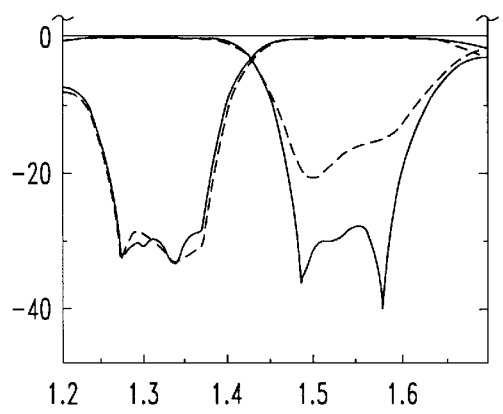

With the λ dependent L and $\tilde{n}$, each term in Eq. (4) is no longer completely periodic, and it becomes necessary to optimize the θ's in Eq. (6) as well as the φ's to get the best filter response. This is illustrated by the solid curves in FIGS. 5(d) and (e). FIG. 5(d) shows the response of the five-coupler 1/2/−2/−2 chain when only the coupler lengths have been optimized with the λ-dependent L and $\tilde{n}$, while FIG. 5(e) shows the same when both the coupler lengths and the delay lengths have been optimized. Only in the latter case have we recovered the rectangular response comparable to that for constant L and $\tilde{n}$. With the planar waveguide for the 1.3/1.55 μm WDM example, the θ-ratio change is from 1/2/−2/−2 to 1.187/1.978/−1.849/−2.031. In the re-optimization, it is advisable to use the results for constant L and $\tilde{n}$ as starting parameters.

In summary, in the optical filter with a chain of arbitrary couplers and differential delays, the basic building block has a quasi-periodic transfer function. The transfer function of the chain is the sum of contributions from all possible optical paths, each of which can form a term in a Fourier series. The task of designing a filter is to optimize the lengths of the couplers and the differential delays so that this Fourier series best approximates the desired filter response. Fourier expansion not only gives a direct and intuitive description of the physical principle of the device, but also provides powerful and flexible design procedures. This Fourier expansion approach enables the most efficient θ-ratio (which is not 1/1/1/1/ . . . used in lattice filters), to include the λ-dependence of L and $\tilde{n}$ which renders the θ-ratio non-integral, and, as will be shown below, to arrive at fully optimized configurations most immune to dominant fabrication errors which involve negative signs in the θ-ratio.

Because of the λ-dependence of L and $\tilde{n}$, many of the equivalent configurations discussed earlier become inequivalent, i.e., the degeneracies are removed. Thus, there are many filter configurations which give somewhat different response. The number of such configurations is large.

Figure 5F:
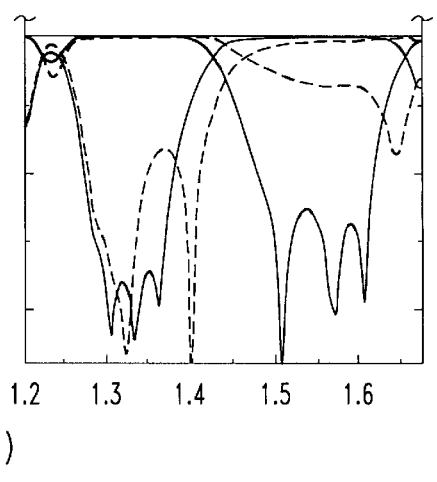

The transmission of two of these configurations for the 1.3/1.55 μm WDM is sown in FIGS. 5(e) and (f). FIG. 5(f) shows a five-coupler chain the same as that in FIG. 5(e) except the θ-ratio is approximately 1/2/2/2. The filter response is also similar to that in FIG. 5(e) except for some fine details. However, a dramatic difference develops between the two cases when the coupling length deviates from the nominal values, as shown by the dashed curves in FIG. 5(e) and (f) for which a 10% overall increase in L has been used in calculating the spectra. The design in FIG. 5(e) is less sensitive to the change in L than the design in FIG. 5(f). For practical fabrication, the coupling length is the parameter most susceptible to uncontrolled fabrication errors (e.g., errors in the geometry and refractive index of the core), and the design in FIG. 5(f) would have a low yield. Therefore, it is advisable to choose out of many configurations the few which are most stable against overall changes in the coupling length as well as with the best filter response and short couplers.

There are many designed filters with various response shapes and bandwidths, and for all cases the configurations most stable against overall changes in L have negative signs in the θ-ratio. While the problem of stability is complicated in nature partly due to the wavelength-dependence of L, a simple physical interpretation is as follows. For a filter with rectangular response to be stable against fabrication errors, the partial sum of the fundamental and, successively, those of the low-order harmonics in the Fourier series of the transfer function should be stable near their zeros. If half of the θ's have negative signs, the fundamental and low-order harmonics correspond to the optical paths crossing the smallest number of couplers, which can be regarded as the dominant optical paths. The zeros of the partial sums produced by these dominant paths are stable against errors in L because they tend to depend only on the ratio of the lengths of the small number of crossed couplers. Filters with negative θ's usually also have short couplers. For the stable 1.3/1.55 μm WDM example shown earlier, the θ-ratio is 1.187/1.978/−1.849/−2.031. This stable design is important for manufacturability.

The design approach of the present invention that is based on Fourier expansion also provides clear guidelines to determine the number of stages of the chain. In principle, as the number of coupler stages is increased, the flatness of the passband and the rejection in the stopband will be constantly improved. In practice, however, several factors limit N from being to large. The first limitation is chip size. With current fabrication processes used on five-inch wafers, the largest N is about 14 for short delay arms (such as those used in the 1.3/1.55 μm WDMs) without using waveguide U-turns (which would consume a large space on the wafer). This limit of N can be increased, however, if high-delta waveguides or U-turns are used. The second limitation is excess insertion loss due to the bends at the ends of each coupler and intrinsic loss in the waveguides. A more subtle yet important consideration is fabrication accuracy and non-ideal effects of couplers and delays. As N is increased, higher order Fourier components, with smaller Fourier coefficients, come into play. However, if the fabrication error exceeds the accuracy required by the smallest Fourier coefficient, increasing N no longer improves the performance of a real device. Similarly, because of non-ideal effects such as excitations to higher order modes at the ends of couplers and asymmetric loss in the delay paths, Eq. (4) is only an approximate description of the transfer function of a real device, and N should be small enough that every term in Eq. (4) is meaningful. For the 1.3/1.55 μm WDMs, note that N=3 to 7 is adequate and practical.

To enhance the stopband rejection to >30 dB, a double or triple-filtering scheme may be adopted using short chains of N=3 to 7. For such a multistage filter, the transfer function is simply the product of that of each stages:

$$t_{\phi\theta}^M = t_{\phi\theta}^{(1)} * t_{\phi\theta}^{(2)} \tag{8}$$

The unwanted light power is thrown away in the extra ports instead going to the other output port, and the crosstalk is reduced at the expense of rounding the flatness of the passband. This can be regarded as a further optimization of the filter under the constraints of chip length and fabrication errors.

Thus, a monolithic optical waveguide filter configured as a Fourier filter comprises a chain of optical couplers of different effective lengths linked by different differential delays. The transfer function of the chain of couplers and delays is the sum of contributions from all possible optical paths, each contribution forming a term in Fourier series whose sum forms the optical output. A desired frequency response is obtained by optimizing the lengths of the couplers and the delay paths so that the Fourier series best approximates the desired response. Further, Fourier filters are advantageously optimized so that they are insensitive to uncontrolled fabrication errors and are short in length.

III. Comb Splitting

Figure 6:
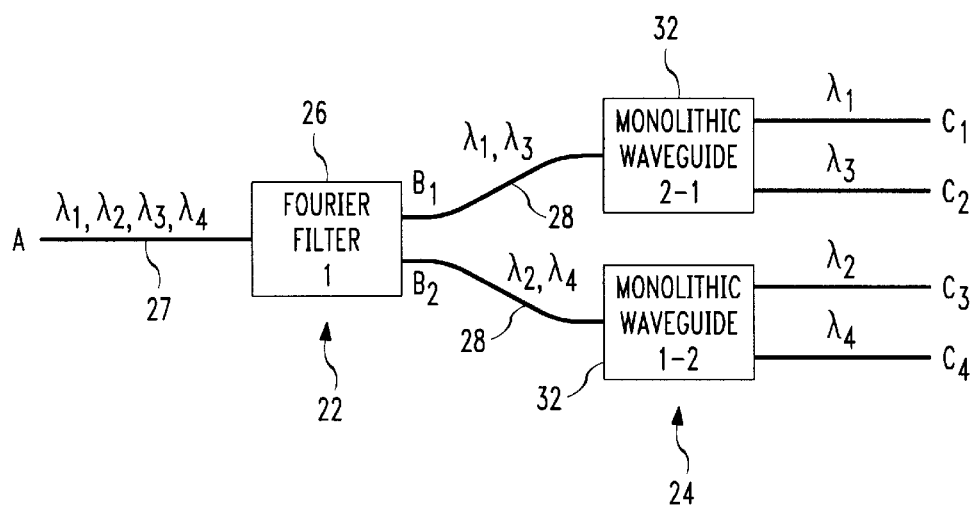
FIG. 6 is a schematic illustration of a comb splitting system in accordance with the present invention wherein the system has two stages, including a one 1×2 Fourier filter in the first stage, two1×2 monolithic waveguide filters in the second stage, and four channels.

A generalized discussion of comb splitting is provided herein below. With reference to FIG. 6, an example of a comb splitting system in accordance with the present invention is shown and is denoted by the reference numeral 20. This example is not to be considered as limiting with regard to the configuration that a comb splitting system can take. In fact, as is discussed in greater detail below, whereas the comb splitting system 20 has only two stages, and therefore has merely a 1×4 split ratio, by increasing the number of cascaded stages, a DWDM in accordance with the present invention can have a relatively large split ratio, and more particularly, a split ratio of $1 \times 2^N$, where N is the number of stages.

The comb splitting system 20 has two interconnected successive stages 22, 24. The first stage 22 has a 1×2 Fourier filter 26 with an input/output optical path 27 for carrying an optical signal having 2N channels, i.e., $\lambda_1, \lambda_2, \lambda_3$ and $\lambda_4$, and two output/input optical paths 28. The Fourier filter 26 demultiplexes and/or multiplexes the optical signal on optical path 27 into/from two bands by utilizing narrow bandpasses. Each of the two bands has a plurality of individual channels that are separated by at least one other of the channels. In this preferred embodiment, the bands are defined as follows. A first band with channels $\lambda_1$ and $\lambda_3$ is carried on branch $B_1$. A second band with channels $\lambda_2$ and $\lambda_4$ is communicated on branch $B_2$.

The second stage 24 has two parallel 1×2 monolithic waveguide filters 32, such as but not limited to Mach-Zehnder or Fourier filters. Each of the filters 32 is configured to communicate with a respective one of the two bands on a respective optical path 28. Each filter 32 demultiplexes and/or multiplexes individual channels from its corresponding band. In this embodiment, the two filters 32 demultiplex and/or multiplex the individual channels $\lambda_1, \lambda_2, \lambda_3$ and $\lambda_4$ with branches $C_1, C_2, C_3$, and $C_4$, respectively.

The comb splitting system 20 can be physically implemented in several different ways. The filters 26, 32 of the comb splitting system 10 can reside on a single integrated circuit, for example, an optical application specific integrated circuit (OASIC). With this configuration, the optical paths 28 can be integrated circuit optical waveguides.

In accordance with a significant feature of the present invention, the second stage filters 32 are configured to utilize bandpasses that are wider than the bandpasses utilized by the first stage Fourier filter 26, and the periodicity (i.e., the free spectral range, FSR) of channels at the second stage filters 32 is larger than at the first stage Fourier filter 26.

As a result of the foregoing configuration, the combing splitting system 20 has numerous advantages, a few of which are delineated hereafter. First, the second stage filters 32 are less expensive and physically smaller than the first stage Fourier filter 26. Second, the separation and routing of channels in the system 20 reduces interference caused by coupling of channels. Third, because of their much wider passbands and FSR, the filters at later stages can tolerate larger fabrication errors, do not require flat passbands and birefringence compensation, and can tolerate full environmental temperature variations without feedback control in the central office. These and other advantages will become more apparent in later discussions pertaining to specific implementations.

Figure 7:
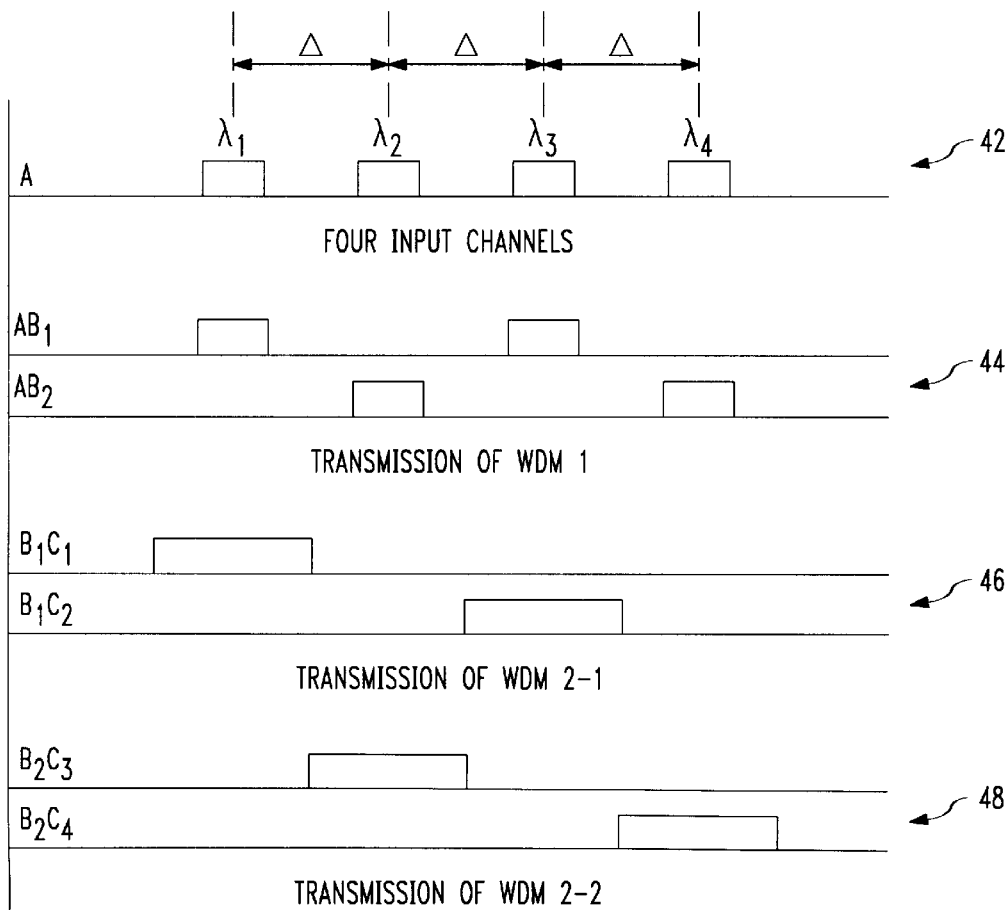
FIG. 7 is a graph illustrating the channel passbands in the comb splitting system of FIG. 6.

With reference to FIG. 7, the first stage Fourier filter 26 of FIG. 6 communicates with an optical signal on optical path 27 having four channels $\lambda_1, \lambda_2, \lambda_3$ and $\lambda_4$, which are preferably equally spaced in frequency as shown at reference numeral 42. Each channel is separated from adjacent channels by the equal spacing Δ of, for example but not limited to, Δ=400 gigahertz (GHz). The first stage Fourier filter 26 has channel spacing equal to Δ and a periodicity (i.e., FSR) of MΔ, where M=2 is the first stage split ratio. Thus, in the demultiplexing mode, the first stage Fourier filter 26 divides the four channels via Fourier expansion, as described above in Section II, into two combs, with $\lambda_1\lambda_3$ in one output and $\lambda_2\lambda_4$ in the other, as is further illustrated in FIG. 7 at reference numeral 44.

The second stage monolithic waveguide filters 32 have a channel spacing MΔ and FSR of MNΔ, where N=2 is the second stage split ratio. The transmission spectrum of second stage monolithic waveguide filter 32 is shifted by Δ relative to that of the other second stage monolithic waveguide filter 32, so that the centers of passbands of both monolithic waveguide filters 32 always line up with the input channels $\lambda_1$ through $\lambda_4$, as illustrated at reference numerals 46 and 48 in FIG. 7. The second stage monolithic waveguide filters 32 thus further split the combs from the first stage Fourier filter 26 into separate channels.

Accordingly, the preferred embodiment described below provides for a DWDM without the excess loss associated with other DWDM configurations via the combination of the flat passbands of Fourier filters and the uniform insertion loss of a wavelength comb splitting scheme.

IV. Preferred Embodiment

Figure 8:
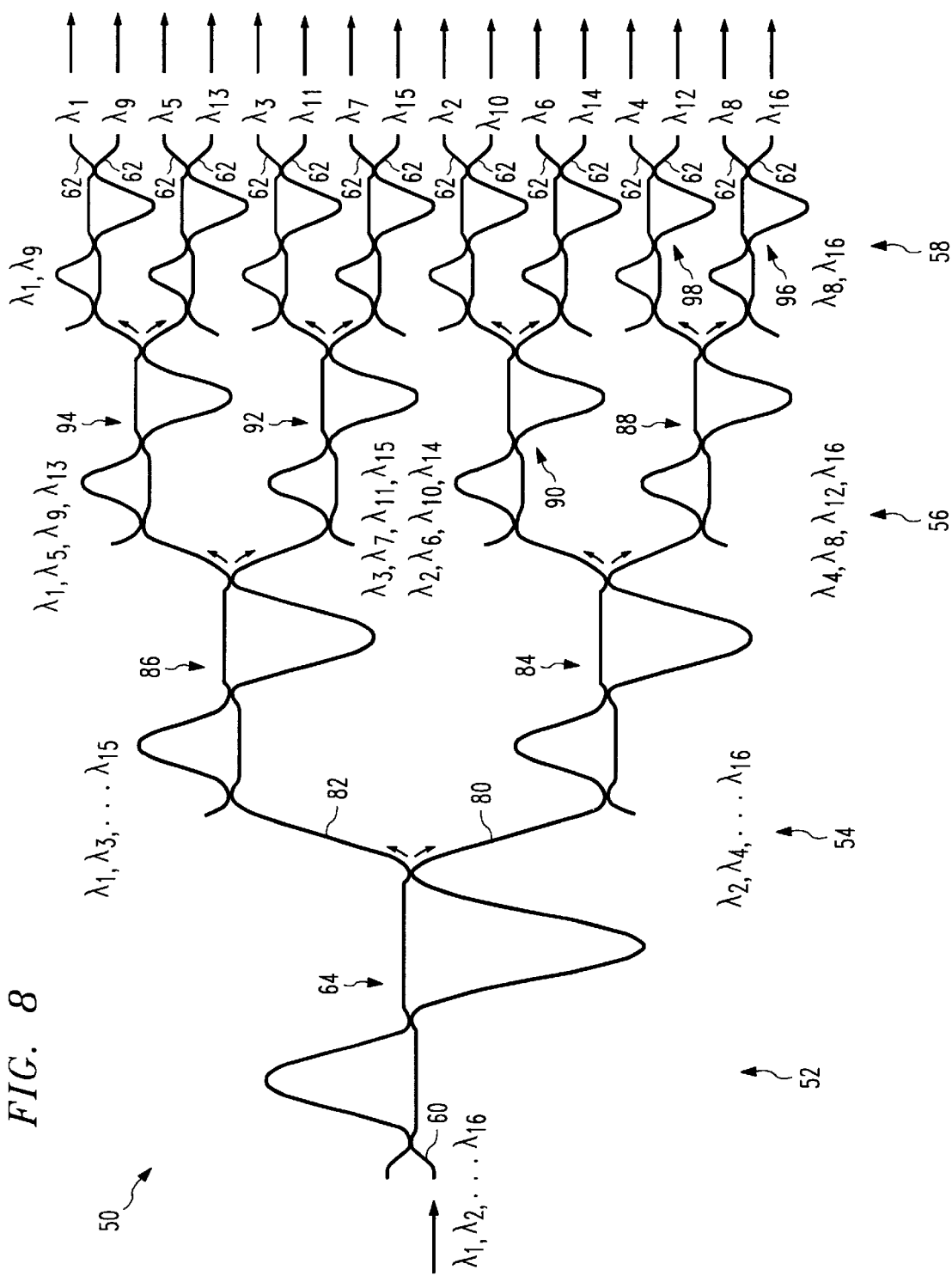
FIG. 8 is a schematic top plan view of a preferred embodiment of a Fourier dense waveguide division multiplexer (DWDM) in accordance with the present invention wherein the system has four stages.

With reference now to FIG. 8, a DWDM 50 in accordance with the preferred embodiment of the present invention is illustrated and denoted by reference numeral 50. The DWDM 50 utilizes a four stage comb splitting scheme with a first stage 52, a second stage 54, a third stage 56, and a fourth stage 58, all connected in series. The comb splitting scheme of DWDM 50 is in accordance with the teachings above in Section III. In general, the DWDM 50 receives a multichannel optical input signal having a plurality of individual channels (e.g., $\lambda_1, \lambda_2, \lambda_3, \ldots, \lambda_{16}$) at various wavelengths on an input waveguide 60. The DWDM 50 then filters the optical input signal into individual channels on respective output waveguides 62.

Figure 9:
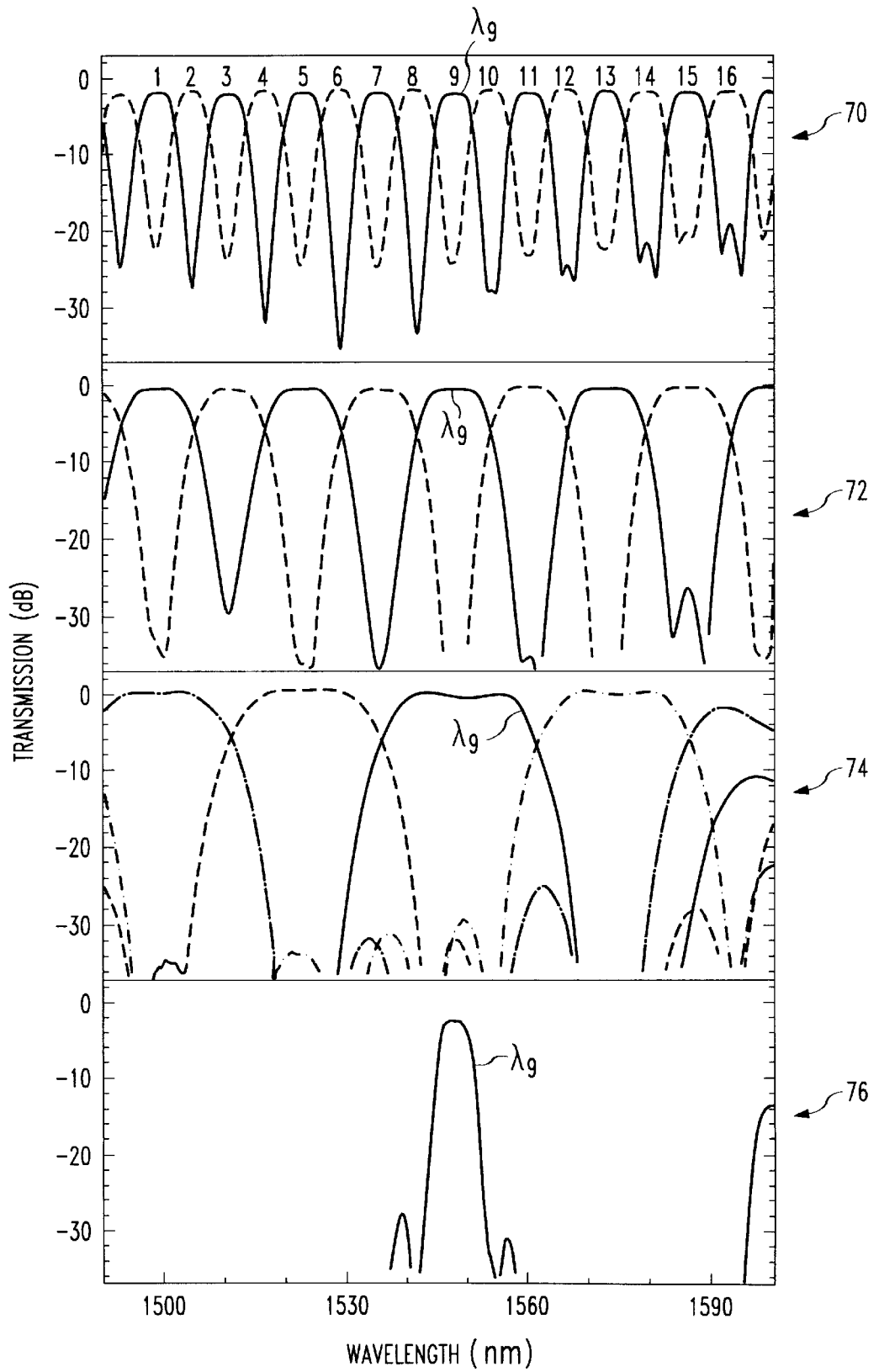
FIG. 9 is a graph illustrating channel passbands at various stages of the Fourier DWDM of FIG. 8.

The first stage 52 comprises a Fourier filter 64 in accordance with the teachings above in Section II, that is, the Fourier filter 64 has a transfer function that is a truncated Fourier series which each harmonic term corresponds to an interference path. By incorporating the Fourier filter 64 in the first stage 52 of the DWDM 50, the flat passbands of the Fourier filter 64 define the passband for each of the output optical signals on the waveguides 62 in accordance with the operation of a comb system. This is because the passband of each successive stage is wider than the previous stage by definition in a comb splitting scheme. This is graphically illustrated in FIG. 9 which presents the filter response of a double-filtered version of the DWDM 50, as described in detail below with reference to FIG. 10. As shown in FIG. 9, the passbands widen from the input to the two output ports of the first stage 52, denoted by reference numeral 70, from the input to the two output ports of the second stage 54, denoted by reference numeral 72, from the input to the four output ports of the combined third and forth stage 56, denoted by reference numeral 74. The combined response of all four stages 52, 54, 56, and 58 for $\lambda_9$ is also shown and denoted by reference numeral 76. Note that the combined response for $\lambda_9$ is substantially the same as the response 70 for $\lambda_9$ after the first stage 52, as is expected in accordance with the operation of a comb splitting system. Thus, the response of the DWDM 50 for each channel is flat and wide as is desirable for greater stability and greater wavelength shift tolerance.

Thus, the input optical signal is filtered by the Fourier filter 64 into two bands of channels defined as the even numbered channels (2, 4, 6, . . . , 16, as shown in dashed lines in FIG. 9) and odd numbered channels (1, 3, 5, . . . , 15, as shown in solid lines in FIG. 9) of the input optical signal, that is, the channels of a band are separated by at least one other of the channels. This is a result of the periodic spectral property of interference filters, including Fourier filters. The two bands are communicated to the second stage 54 via optical paths 80, 82, as shown in FIG. 8. In the preferred embodiment, the second stage 54 is comprised of two Fourier filters 84, 86. In the preferred embodiment, however, since the passband of the filters utilized to implement the stages subsequent to the first stage 52 are wider than those of the first stage 52, simple Mach-Zehnder filters are suitable. The advantage of Mach-Zehnder filters for implementing subsequent stages is that the device length is shorter and the device cost is less, but the passbands will be somewhat narrowed. The advantage of Fourier filters for implementing subsequent stages is that the DWDM would have wider passbands and lower crosstalk but, as indicated, the device would be longer and cost more.

The filters 84, 86 of the second stage 54 divide their respective band of channels received on optical paths 80, 82, respectively, into an even numbered group and an odd numbered group, that is, the channels of a group, or subband, are separated by at least four other of the channels. With reference to FIG. 8, filter 84 divides the even channels between filters 88, 90 of the third stage 56, with the channels alternately going to filter 88 and filter 90, as shown. In substantially the same manner, filter 86 divides the odd channels between filters 92 and 94 of the third stage 56. The filters 88, 90, 92, 94 are Mach-Zehnder filters though they can alternatively be implemented with Fourier filters as discussed above.

Each of the filters 88, 90, 92, and 94 of the third stage 56 divides the sub-band of channels it receives from the second stage 54 between two filters of the fourth stage 58. For example, filter 88 divides the sub-band including $\lambda_4, \lambda_8, \lambda_{12}$, and $\lambda_{16}$ between filters 96 and 98 whereby filter 96 receives $\lambda_4, \lambda_{12}$ and filter 98 receives $\lambda_8, \lambda_{16}$. Filters 90, 92, and 94 operate in a similar manner. As with the second stage 54 and the third stage 56, the filters that comprise the fourth stage 58 are Fourier filters, though they can be implemented with Mach-Zehnder filters if desired.

Each of the filters of the fourth stage 58 receives an optical signal with two channels and then divides the two channels onto individual output waveguides 62, as shown in FIG. 4. Thus, the output of the DWDM 50 provides for a single channel on each output waveguide 62. Further, as an advantage of the present invention, the power of the different channels is substantially equal since all the outputs are connected to the input by the same number of filter stages, and the insertion loss for each optical path through the DWDM is the same.

It should be noted that DWDM 50 is merely illustrative of a DWDM in accordance with the present invention. A courser or more dense division can be made by reducing or adding stages, respectively. For instance, by reducing the number of stages to three, the split ratio of the DWDM 50 would be 1:4. Alternatively, by adding another stage to DWDM 50 so that there are five stages, the split ratio would be 1:32. Thus, the maximum split ratio of a DWDM in accordance with the present invention is $2^N$, where N is the number of cascaded stages.

Further, the linear and cascading arrangement of filters of DWDM 50 is more spacially efficient than a Dragone router DWDM, which is especially important with regard to fabrication of these passive optic network (PON) devices on a single wafer (i.e., substrate). This is because the DWDM 50 is configured in a narrow strip while a Dragone router is arcuate in shape. Thus, if straight line saw cuts of the wafer are masked to separate the DWDM device, then more devices can be fabricated on each wafer using the Fourier filter design disclosed herein. In addition, the respective stages of DWDM 50 can reside within separate discrete components that are connected locally at a mode of an optical fiber network. Alternatively, the respective stages of DWDM 50 can reside at different nodes of an optical fiber network whereby the stages are interconnected via a fiber cable so as to form a distribution network.

V. Alternative Embodiment

Figure 10:
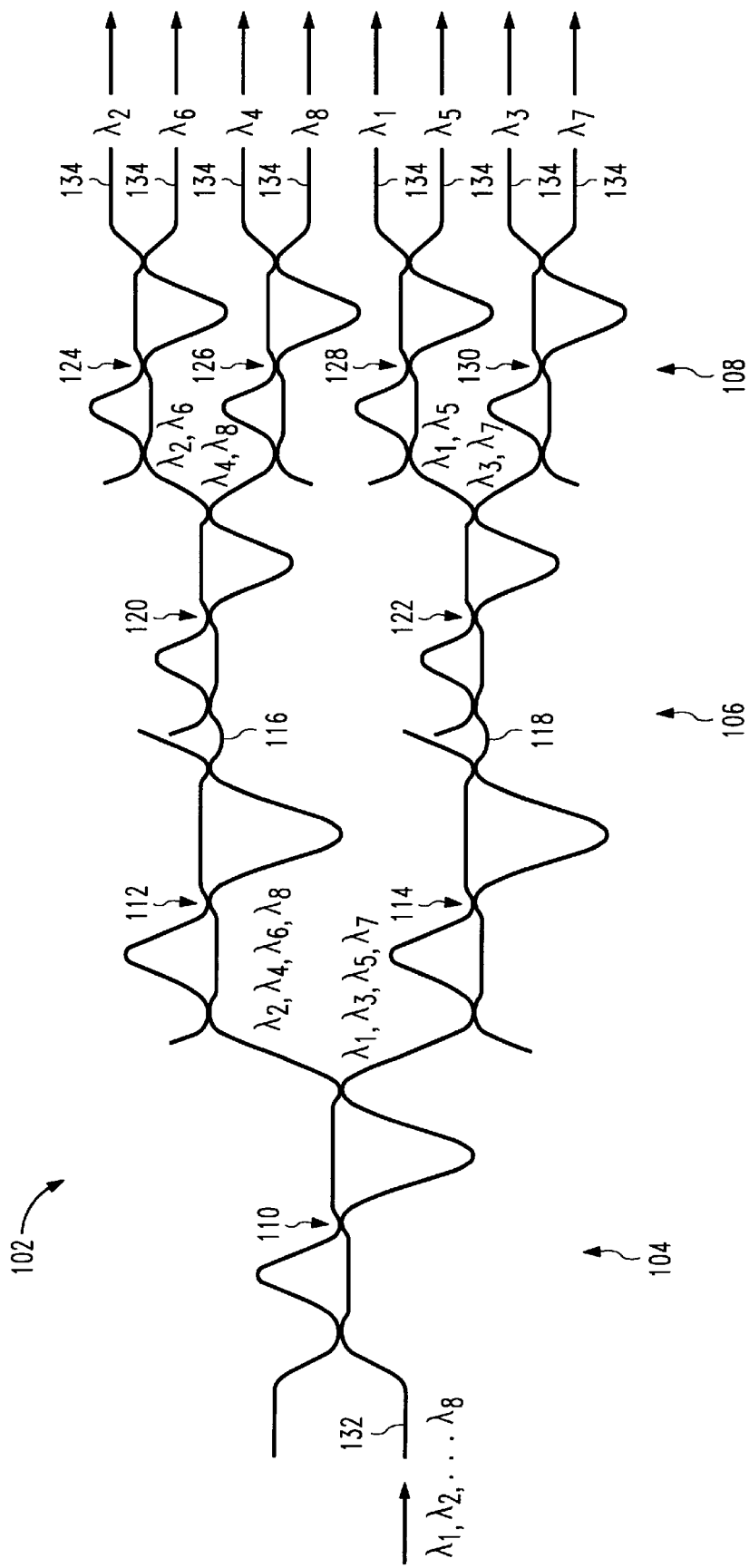
FIG. 10 is a schematic top plan view of an alternative embodiment of a Fourier DWDM in accordance with the present invention wherein the DWDM utilizes a double filtering scheme.

With reference to FIG. 10, an alternative embodiment 1×8 DWDM 102 is illustrated. The DWDM 102 incorporates a double filtering scheme in order to reduce crosstalk between the channels, i.e., to enhance channel isolation. The DWDM 102 comprises a first stage 104, a second stage 106, and a third stage 108. In accordance with the present invention, the first stage comprises a Fourier filter as described above. The flat passband of the Fourier filter in the first stage 104 essentially controls the filter response of the DWDM 102 since, in a comb splitting scheme, the passbands of the second and third stages 106, 108 are wider than the passband of the first stage 104. Consequently, simple Mach-Zehnder filters can be utilized to implement the second and third stages 106, 108 without significantly narrowing the passbands. However, as with the preferred embodiment, Fourier filters utilized to implement the stages subsequent to the first stage 104.

In order to achieve double filtering, two adjacent stages of filters are connected in series by similar filters. This is illustrated in FIG. 10 wherein a first filter 110 has connected to its outputs second filters 112, 114 of the second stage 106. The filters 112, 114 are substantially similar to the filter 110, and more particularly, the length of the optical coupler and the differential delays are substantially the same. Thus, the optical signal at the output ports 116 and 118 of filters 112 and 114, respectively, has less crosstalk from the other channel, as is characteristic of double filtering schemes. In a demultiplexing mode, any crosstalk resulting from the first stage 104 is cleaned up (i.e., reduced) by the filters 112, 114 of the second stage 106, and in the multiplexing mode, any crosstalk resulting from the second stage 106 is cleaned up in the first stage 104.

In the second stage 106, filters 120, 122 are connected in series to respective second filters 112, 114 by optical paths 116, 118. Each of the filters 120 and 122 is configured to further divide the optical signal with wider passbands than that of the first stage 104, in accordance with comb splitting. The output ports of the filters 120 and 122 are connected to respective filters 124, 126, 128, and 130 that comprise the third stage 130. As with the filters connecting the first and second stages, the filters 124, 126, 128 and 130 are substantially similar to filters 120, 122 in order to enhance the isolation of the filtered signals. The filters 124, 124, 128 and 130 perform a final division of the input optical signal.

Accordingly, the DWDM 102 receives an input optical signal on input waveguide 132 that comprises a plurality of individual channels (e.g., $\lambda_1, \lambda_2, \lambda_3, \ldots, \lambda_8$) and filters the input optical signal into individual channels on the output waveguides 134. Because of the double filtering configuration, the output signal can have greater isolation than that of a Dragone router DWDM.

It will be obvious to those skilled in the art that many modifications and variations may be made to the embodiments as described without substantially departing from the spirit and scope of the present invention. It is intended that all such modifications and variations be included herein within the scope of the present invention, as is set forth in the appended claims.

Wherefore, the following is claimed:

1. A dense waveguide division multiplexer for demultiplexing an optical signal into a plurality of individual channels at various wavelengths, comprising:

a first stage comprising a Fourier filter for receiving said optical signal having said plurality of individual channels at various wavelengths and for demultiplexing said plurality of individual channels onto a plurality of first stage output paths with first passbands, wherein the said Fourier filter is a multipath interference device with a transfer function that is a truncated Fourier series where each harmonic term corresponds to an interference path; and a second stage comprising a plurality of Mach-Zehnder filters, wherein each said Mach-Zehnder filter is connected to a respective said first stage output path of said first stage Fourier filter for demultiplexing said channels received from said first stage onto a plurality of second stage output paths with second passbands that are wider than said first passbands.

2. The dense waveguide division multiplexer of claim 1, wherein said first stage and said second stage reside on a single substrate.

3. The dense waveguide division multiplexer of claim 1, wherein said first stage and said second stage reside within separate discrete components that are connected locally at a node of an optical fiber network.

4. The dense waveguide division multiplexer of claim 1, wherein said first stage and said second stage are separated and reside at different nodes of an optical fiber network and are interconnected via a fiber cable so that a distribution network is formed.

5. The dense waveguide division multiplexer of claim 1, wherein said Mach-Zehnder filters of said second stage comprise Fourier filters having a plurality of interference paths, each said interference path providing an optical signal whose amplitude and phase form a term of a Fourier series comprising the filter transmission function of said second stage.

6. The dense waveguide division multiplexer of claim 1, further including a third stage comprising Mach-Zehnder filters, wherein each said third stage Mach-Zehnder filter is connected to a respective said second stage output path for demultiplexing said channels received from said second stage with third passbands that are wider than said second passbands.

7. The dense waveguide division multiplexer of claim 1, wherein said first stage and said second stage comprise a double filtering scheme for reducing crosstalk, wherein said second stage includes a second Fourier filter connected in series to each of said first stage output paths, and wherein each said second Fourier filter is substantially identical to said Fourier filter of said first stage.

8. The dense waveguide division multiplexer of claim 1, wherein said Fourier filter comprises a pair of optical waveguides forming a sequence of N>2 couplers alternating with a plurality of N-1 delay paths between said couplers, wherein the effective length of one of said couplers differs by more than 5% from an effective length of another coupler and a differential delay provided by one of said delay paths differs by more than 10% from the differential delay provided by another of said delays.

9. The dense waveguide division multiplexer of claim 8, wherein the differential delay provided by at least one of said delay paths is opposite in sign from the differential delay provided by another of said delay paths.

10. A dense waveguide division multiplexer for demultiplexing an optical signal into a plurality of individual channels at various wavelengths, comprising:

a first stage comprising a Fourier filter for receiving said optical signal having said plurality of individual channels at various wavelengths and for demultiplexing said plurality of individual channels onto a plurality of first stage output paths with first passbands; and a second stage comprising a plurality of Mach-Zehnder filters, wherein each said Mach-Zehnder filter is connected to a respective said first stage output path of said first stage Fourier filter for demultiplexing said channels received on said first stage output path onto a plurality of second stage output paths with second passbands.

11. The dense waveguide division multiplexer of claim 10, wherein said second passbands are wider than said first passbands.

12. The dense waveguide division multiplexer of claim 10, wherein said Mach-Zehnder filters of said second stage comprise Fourier filters having a plurality of interference paths, each said interference path providing an optical signal whose amplitude and phase form a term of a Fourier series comprising the filter transmission function of said second stage.

13. The dense waveguide division multiplexer of claim 10, further comprising a third stage comprising Mach-Zehnder filters wherein each said third stage Mach-Zehnder filter is connected to a respective said second stage output path for demultiplexing said channels received from said second stage with third passbands that are wider than said second passbands.

14. The dense waveguide division multiplexer of claim 10, wherein said first stage and said second stage comprise a double filtering scheme for reducing crosstalk, wherein said second stage includes a second Fourier filter connected in series to each of said first stage output paths, and wherein each said second Fourier filter is substantially identical to said Fourier filter of said first stage.

15. A dense waveguide division multiplexer for multiplexing a plurality of optical signals at various wavelengths into an optical signal, comprising:

a first stage comprising a plurality of Mach-Zehnder filters, wherein each said Mach-Zehnder filter is configured for receiving said plurality of optical signals at various wavelengths for multiplexing said plurality into bands onto a plurality of first stage output paths with first passbands, each output path corresponding to one of said Mach-Zehnder filters; and a second stage comprising a Fourier filter having an input path connected to each of said first stage output paths for receiving said bands and for multiplexing said bands onto second stage output path with second passbands, wherein said second passbands are narrower then said first passbands.

16. A dense waveguide division multiplexer of claim 15, wherein said dense waveguide division multiplexer includes a double filtering scheme to reduce crosstalk.

17. A method for demultiplexing an optical signal into a plurality of individual channels at various wavelengths, comprising the steps of:

receiving said optical signal having said plurality of individual channels at various wavelengths;

demultiplexing bands of individual channels from said plurality of individual channels with a first Fourier filter having first passbands, said channels in each of said bands being separated by at least one other channel; and demultiplexing said individual channels from each of said bands with a plurality of Mach-Zehnder filters having second passbands that are wider than said first passbands.

18. The method of claim 17, wherein said Mach-Zehnder filters comprise Fourier filters.

19. A method for multiplexing a plurality of individual channels at respective wavelengths to form an optical signal, comprising the steps of:

receiving said plurality of individual channels at various wavelengths;

multiplexing said individual channels from said plurality into bands with a plurality of first optical filters having first passbands, said channels in each of said bands being separated by at least one other channel; and producing said optical signal by multiplexing said bands with a Fourier filter having second passbands that are narrower than said first passbands.

* * * * *